(12) United States Patent
Hoogestraat et al.

(10) Patent No.: US 8,864,433 B2
(45) Date of Patent: Oct. 21, 2014

(54) EXTENDABLE BIN SWEEP

(75) Inventors: Alan G. Hoogestraat, George, IA (US); Lyle K. Hollander, George, IA (US)

(73) Assignee: Sudenga Industries, Inc., George, IA (US)

( * ) Notice: Subject to any disclaimer, the term of this patent is extended or adjusted under 35 U.S.C. 154(b) by 1303 days.

(21) Appl. No.: 12/696,500

(22) Filed: Jan. 29, 2010

(65) Prior Publication Data

US 2010/0239399 A1  Sep. 23, 2010

Related U.S. Application Data

(60) Provisional application No. 61/162,365, filed on Mar. 23, 2009, provisional application No. 61/263,586, filed on Nov. 23, 2009.

(51) Int. Cl.
*B65G 65/00* (2006.01)
*B65G 65/46* (2006.01)

(52) U.S. Cl.
CPC ................................ *B65G 65/466* (2013.01)
USPC .......................... 414/326; 198/608; 198/594

(58) Field of Classification Search
USPC ................ 414/310; 198/550.01, 550.6, 550.1
See application file for complete search history.

(56) References Cited

U.S. PATENT DOCUMENTS

| | | | | |
|---|---|---|---|---|
| 2,845,167 A * | 7/1958 | Heiken | ......................... | 198/660 |
| 4,253,946 A * | 3/1981 | Ludwig | ......................... | 209/283 |
| 4,356,910 A * | 11/1982 | Togstad | ......................... | 198/660 |
| 5,099,986 A * | 3/1992 | Kuzub | ......................... | 198/666 |
| 5,167,318 A | 12/1992 | Siemens | | |
| 6,012,272 A * | 1/2000 | Dillon | ......................... | 56/14.6 |
| 6,125,618 A * | 10/2000 | Dillon | ......................... | 56/14.6 |
| 6,233,911 B1 * | 5/2001 | Dillon | ......................... | 56/14.6 |
| 7,381,131 B1 * | 6/2008 | Harpole | ......................... | 460/114 |
| 8,328,002 B2 * | 12/2012 | Rayhons | ......................... | 198/666 |
| 8,381,900 B1 * | 2/2013 | Hoogestraat | ......................... | 198/588 |

OTHER PUBLICATIONS

Springland Mfg. "Commercial Series Bin Sweeps" brochure (3 pages) (published prior to Jan. 29, 2009).
Springland Mfg. "Commercial Series Bin Sweep" brochure (3 pages) (published prior to Jan. 29, 2009).
May 1984—AGI-Sweep brochure (2 pages).
Springland Quality Design and Dependable Construction Mean Efficient and Maintenance Free Operations; http://www.springland.ca/commsweep.htm, 3 pages (dated Oct. 31, 2008).
Chief Industries TITAN 1.1 brochures (2007).

* cited by examiner

*Primary Examiner* — Saul Rodriguez
*Assistant Examiner* — Glenn Myers
(74) *Attorney, Agent, or Firm* — James L. Young; Westman, Champlin & Koehler, P.A.

(57) ABSTRACT

A bin sweep comprising a first auger section configured to be movably mounted to a central support framework of a storage bin, and a second auger section operably engaged with the first auger frame such that the second auger section is moveable relative to the first section frame substantially along an axis.

15 Claims, 16 Drawing Sheets

EXTENDABLE BIN SWEEP

CROSS-REFERENCE TO RELATED APPLICATION(S)

The present application is based on and claims priority to U.S. Provisional Patent Application No. 61/162,365, filed on Mar. 23, 2009; and to U.S. Provisional Patent Application No. 61/263,586, filed on Nov. 23, 2009, the disclosures of which are incorporated by reference in their entireties.

BACKGROUND

The present disclosure relates to storage bins, such as agricultural storage bins for storing grains and other commodities. In particular, the present disclosure is directed to bin sweeps for use in storage bins.

Storage bins for grain and other commodities, such as salt, fertilizer, and the like, are used in a variety of agricultural and industrial applications. Such bins often have circular footprints, and thus are generally cylindrical in shape, but other bin footprints are also employed. It is known for cylindrical grain bins to have a bin clean-out system including an in-floor auger with a central inlet and an outlet outside of the bin. A bin sweep is typically connected to the in-floor auger so that as the bin sweep passes through the grain bin, grain is driven toward the inlet of the in-floor auger to be removed from the grain bin.

Some grain bins are quite large in diameter. Because of the large distances between opposing bin walls, such large grain bins may include one or more tower structures or uprights disposed in the center of the grain bin to support the roof of the grain bin. However, such tower structures effectively prevent bin sweeps from being mounted on single central pivot axes because the tower structure would interfere with movement of the grain sweep. Additionally, the large dimensions of such grain bins may require multiple passes to drain the stored grains in order to maintain the structural integrity of the walls of the large grain bins.

SUMMARY

An aspect of the present disclosure is directed to a bin sweep that includes a first auger section configured to be movably mounted to a central support framework of a storage bin, and a second auger section operably engaged with the first auger frame such that the second auger section is moveable relative to the first section frame substantially along an axis. The bin sweep also includes a mechanism secured to the first auger section and configured to direct the movement of the second auger section relative to the first auger section.

Another aspect of the disclosure is directed to a bin sweep that includes a first section frame having a first end and a second end, where the first end of the first section frame is configured to be movably mounted to a central support framework a storage bin. The bin sweep also includes a first auger rotatably supported by the first section frame, a track operably secured to the first section frame, a second section frame having a first end and a second end, and a second auger rotatably supported by the second section frame. The bind sweep further includes a guide sleeve operably secured to the second section frame and engaged with the track to restrict movement of the second section frame relative to the first section frame to directions that are substantially along an axis. The bin sweep even further includes a drive motor operably mounted to at least one of the first section frame and the second section frame, where the drive motor is configured to direct the movement of the second section frame relative to the first section frame.

A further aspect of the disclosure is directed to a method for sweeping a storage bin. The method includes rotating a first auger supported by a first section frame of a bin sweep, and rotating a second auger support by a second section frame of the bin sweep, where the second section frame is operably engaged with the first section frame. The method also includes moving the first section frame relative to a central support framework of the storage bin to cover a first footprint of the storage bin, and extending the second section frame relative to the first section frame substantially along an axis. The method further includes moving the first section frame relative to the central support framework to sweep a second footprint of the storage bin after extending the second section frame, where the second footprint has a greater area than the first footprint.

This Summary is provided to introduce a selection of concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure is referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

The present disclosure is directed to an extendable bin sweep for use in storage bins, such as storage bins for grain and other commodities. The extendable bin sweep includes inner and outer auger sections, where the outer auger section is configured to extend and retract relative to the inner auger section. As discussed below, this allows the extendable bin sweep to pass over different areas or footprints within a storage bin for moving materials (e.g., grain).

Figure 1:
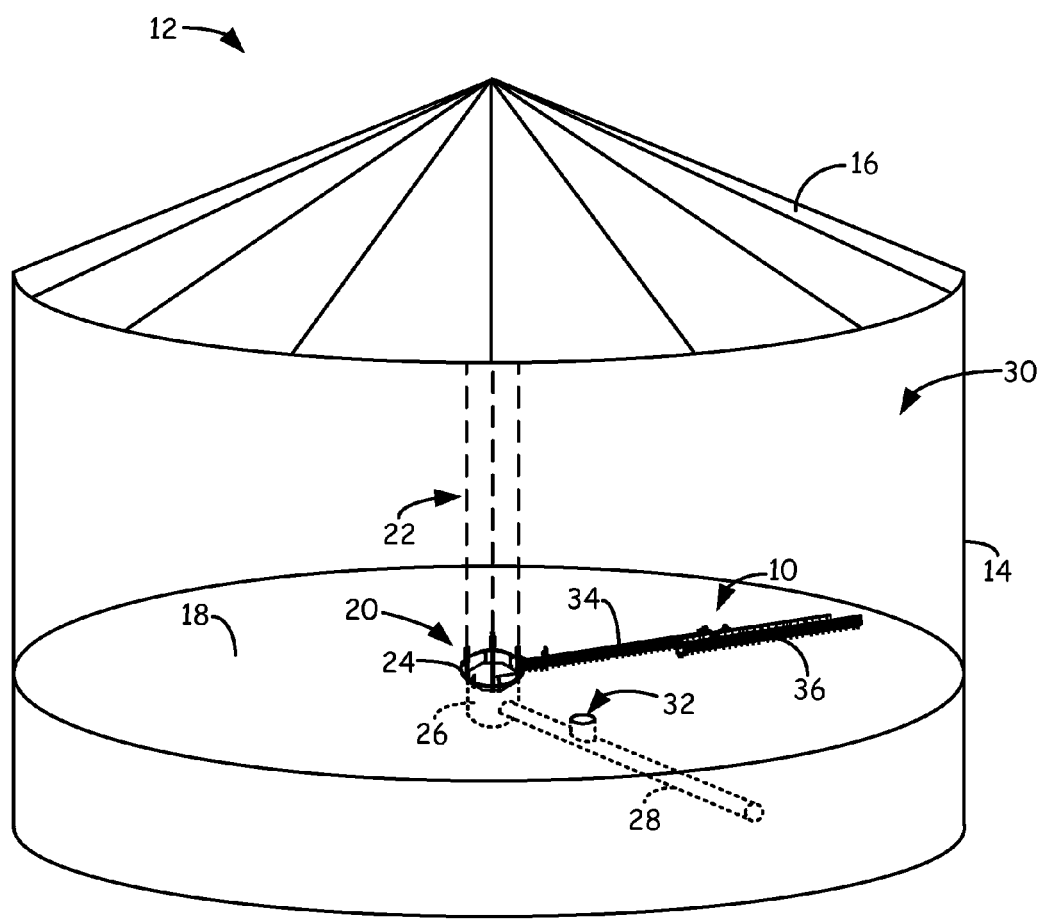
FIG. 1 is a perspective view of an extendable bin sweep of the present disclosure in use with a grain bin.

As shown in FIG. 1, bin sweep 10 is mounted in grain bin 12, where bin sweep 10 is an example of a suitable extendable bin sweep of the present disclosure. The following discussion of bin sweep 10 is made with reference to grain bin 12 for moving grain. However, extendable bin sweeps of the present disclosure (e.g., bin sweep 10) may be used with storage bins for a variety of commodities, such as grains, salt, fertilizer, and the like.

As shown, grain bin 12 includes bin wall 14, which offsets conical roof 16 and bin floor 18. Bin wall 14 and bin floor 18 define a circular floor geometry, where the dimensions of circular floor may extend to large surface areas. For example, grain bins, such as the "TITAN 1.1" grain bin from Chief Industries, Inc., Grand Island, Nebr., may exhibit a diameter of over 47 meters (over 154 feet). Because of the large distance between the opposing faces of bin wall 14, grain bin 12 includes support framework 20, which in the shown embodiment, is centrally located within bin wall 14. Support framework 20 includes uprights 22 and guide 24, where uprights are mounted to bin floor 18 and provide overhead support for conical roof 16.

In the shown embodiment, guide 24 is a circular rail guide mounted about uprights 22 and is desirably fixed relative to bin floor 18. In this embodiment, it is not possible to mount bin sweep 10 on a single central pivot axis because uprights 22 would interfere with movement of bin sweep 10. As such, bin sweep 10 may be movably mounted to guide 24 in a manner that allows bin sweep 10 to move around guide 24. This arrangement allows bin sweep 10 to move around grain bin 12 without running into uprights 22.

Grain bin 12 also includes central sump 26, which is centrally located within bin walls 14 and extends below bin floor 18. In the shown embodiment, central sump 26 is located circumferentially within uprights 22 and guide 24, and provides a convenient location to receive grain from bin sweep 10. The grain received by central sump 26 may be moved outside of grain bin 12 through in-floor shaft 28 with the use of an under-floor conveying or reclaim system, which may include material conveying components such as an auger, belt, paddle, gravity pit, air reclaim, or the like.

During a bin clean-out to remove grain from the chamber of grain bin 12 (referred to as chamber 30), bin sweep 10 may move around guide 24 in one or more passes to drive the grain from chamber 30 toward central sump 26. The grain that falls into central sump 26 may then be transported to an external location outside of grain bin 12 through in-floor shaft 28. In some embodiments, in-floor shaft 28 may also be accessible to chamber 30 via one or more additional inlets along bin floor 18 (e.g., inlet 32), where bin sweep 10 may also drive the grain directly into in-floor shaft 28 via the inlet(s).

In order to maintain the structural integrity of bin walls 14, it may be necessary to drain the grain from chamber 30 in two or more passes, where a first pass may remove the grain from a central annular region of chamber 30 (e.g., adjacent support framework 20), and a second pass may remove the grain from an outer annular region of chamber 30 (e.g., adjacent bin wall 14). To accomplish this, bin sweep 10 includes inner section 34 and outer section 36, where inner section 34 is a first auger section of bin sweep 10 that is moveably mounted to guide 24.

Outer section 36 is a second auger section of bin sweep 10 that is configured to move around chamber 30 with inner section 34, and is further configured to extend and retract relative to inner section 34. As such, when bin sweep 10 moves around guide 24 to remove the grain from the central annular region of chamber 30, outer section 36 may be in a retracted state relative to inner section 34. When the first pass is complete, outer section 36 may then be partially or fully extended relative to inner section 34 to reach the grain located in the outer annular region of chamber 30 (e.g., adjacent to bin walls 14). This allows bin sweep 10 to pass over different areas or footprints within chamber 30 in multiple passes for moving grain to central sump 26.

Figure 2:
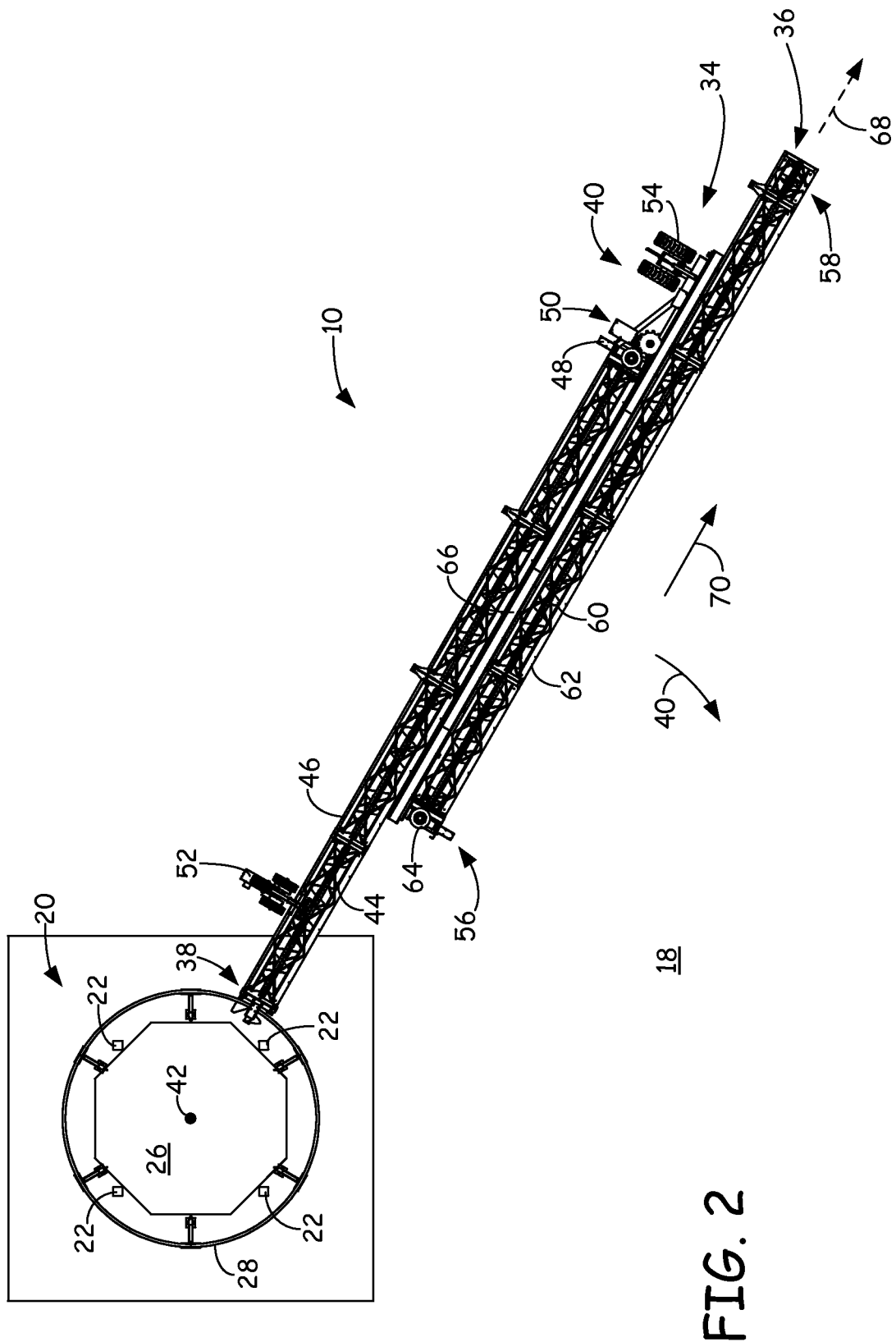
FIG. 2 is a top elevational view of the extendable bin sweep in use with a central support framework of the grain bin, where an outer section of the extendable bin sweep is in a retracted state relative to an inner section of the extendable bin sweep.
Figure 3:
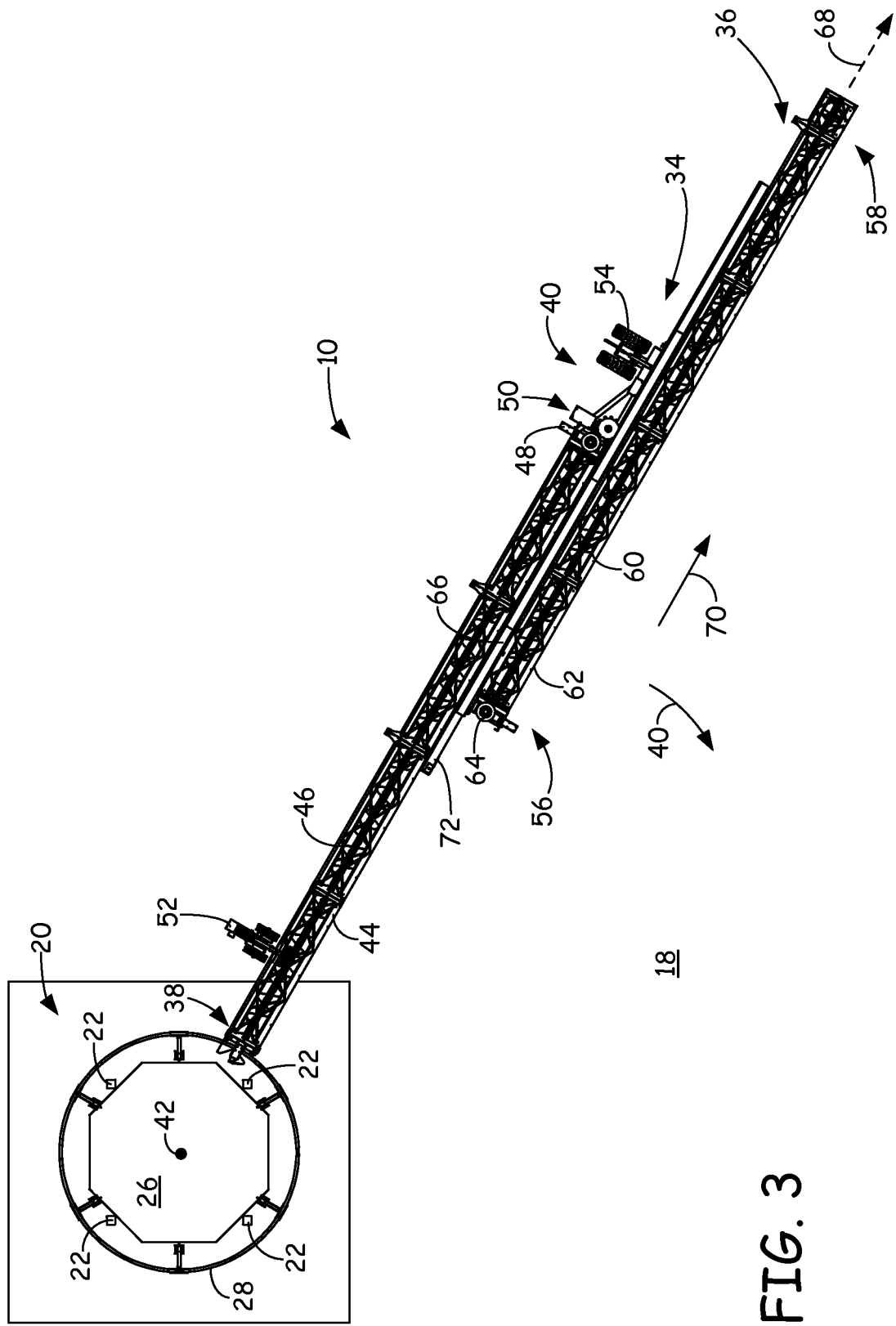
FIG. 3 is a top elevational view of the extendable bin sweep in use with the central support framework, where the outer section is partially extended relative to the inner section.
Figure 4:
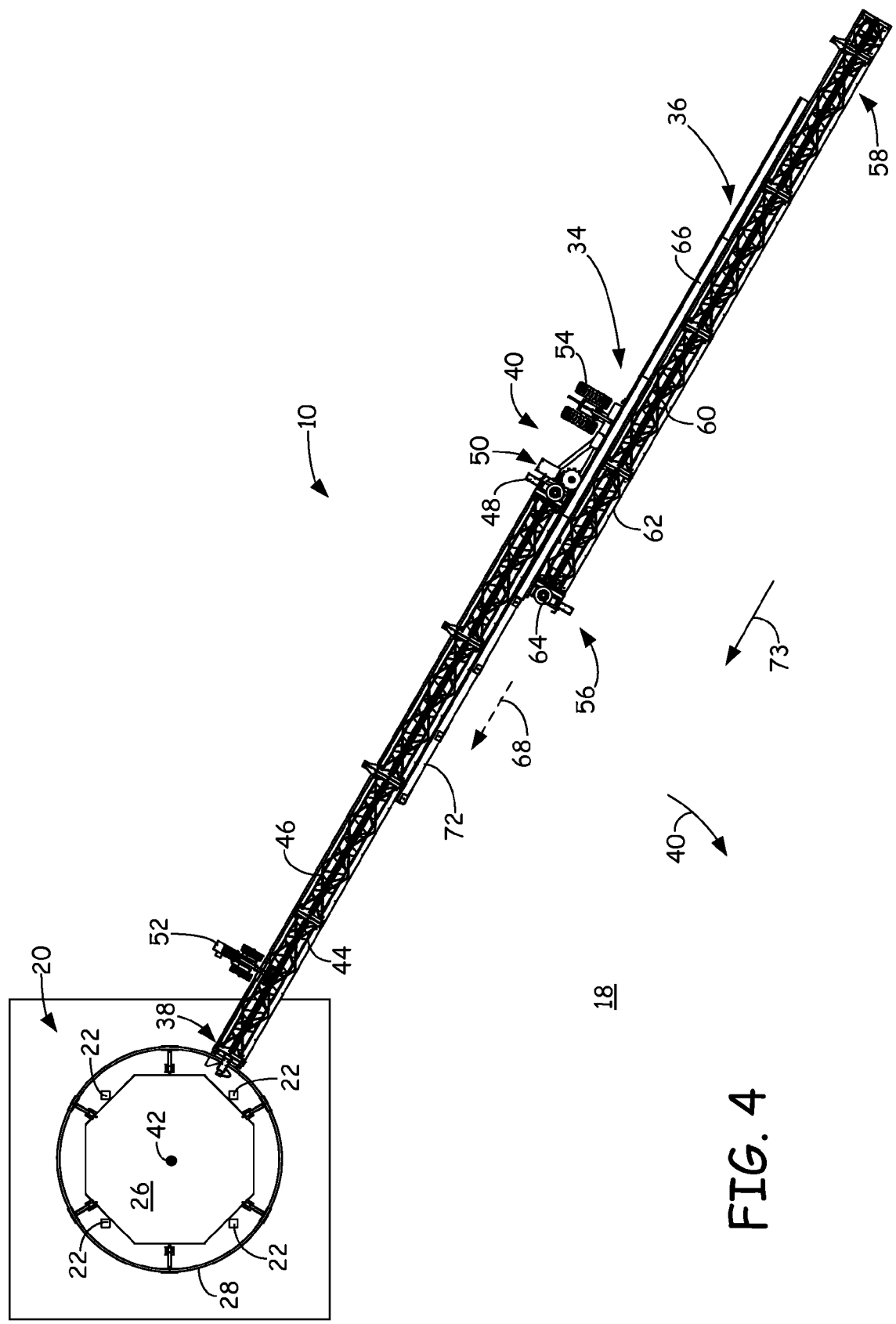
FIG. 4 is a top elevational view of the extendable bin sweep in use with the central support framework, where the outer section is fully extended relative to the inner section.

FIGS. 2-4 illustrate outer section 36 in different positions relative to inner section 34, including a retracted state (FIG. 2), a partially-extended state (FIG. 3), and a fully extended state (FIG. 4). As shown in FIG. 2, inner section 34 includes inner end 38 and outer end 40, where inner end 38 is the portion of inner section 34 that is movably mounted to guide 28 in a manner that allows bin sweep 10 to move in an appropriate direction (for example, as shown by arrow 40) about central axis 42.

Structurally, inner section 34 includes auger 44 rotatably mounted below section frame 46. As used herein, the term "auger" refers to a mechanism for moving a material, such as grain, and may include material conveying components such as an auger with flighting, a chain with paddles, a belt, a cleated belt, and the like. The axis of auger 44 extends along the longitudinal length of section frame 46 and is generally aligned along a radial line relative to the central axis 42 as the bin sweep 10 traverses bin floor 18.

Inner section 34 also includes auger motor 48 and extension drive assembly 50 mounted to section frame 46 at outer end 40, where auger motor 48 is operably connected to auger 44 below section frame 46 to rotate auger 44 during operation. In an alternative embodiment, auger motor 48 may be located at inner end 38, thereby operably connecting to the opposing end of auger 44 from that shown in FIG. 2.

Bin sweep 10 may be moved around chamber 30, such as in the direction of arrow 40, by operation of one or more tractors, such as tractors 52 and 54. Tractors 52 and 54 may each have an independently operable motor and one or more wheels that engage bin floor 18. Tractor 52 is mounted to inner section 34 proximate inner end 38, and tractor 54 is mounted to inner section 34 at outer end 40. In alternative embodiments, tractors 52 and 54 may be mounted to a variety of different locations along inner section 34 and/or outer section 36.

Bin sweep 10 may be maintained relative to central axis 42 by an alignment control system (not shown) operating in conjunction with tractor 52 and/or tractor 54. For example, sensors (e.g., mechanical, optical sensors, and the like, not shown) may continually detect whether bin sweep 10 is skewed from radial lines extending from central axis 42. If a skew is detected, the alignment control system may then coordinate activation of one or both of the motors on tractors 52 and 54 to realign bin sweep 10 to the radial lines of central axis 42. Ideally, the bin sweep 10 rotates all the way around guide 24 while continuously aligned on radial lines extending from central axis 42.

As further shown in FIG. 2, outer section 36 includes inner end 56 and outer end 58, and includes a similar arrangement to inner section 36. Accordingly, outer section 36 includes auger 60 rotatably mounted below section frame 62, and auger motor 64 mounted to section frame 62 at inner end 56, where auger motor 64 is operably connected to auger 60 to rotate auger 60 below section frame 62 during operation. In an alternative embodiment, auger motor 64 may be located at outer end 58, thereby operably connecting to the opposing end of auger 60 from that shown in FIG. 2. However, the arrangement shown in FIG. 2 allows auger motor 48, extension drive assembly 50, and auger motor 64 to remain relatively close together when outer section 36 extends. This reduces the complexity of the electrical lines required to operate auger motor 48, extension drive assembly 50, and auger motor 64. Furthermore, augers 44 and 60 may exhibit the same or similar dimensions, and may operate at the same or different rotational speeds for driving grain to central sump 26.

During operation, auger motor 48 rotates auger 44 and auger motor 64 rotates auger 60. This allows augers 44 and 60 to drive grain from chamber 30 toward central sump 26 for removal via in-floor shaft 28 (shown in FIG. 1). Tractors 52 and 54 may also operate to move bin sweep 10 around guide 28 in the direction of arrow 40, thereby allowing augers 44 and 60 to drive the grain that is located within a central annular region of chamber 30. As discussed above, to increase the footprint covered by bin sweep 10, outer section 36 may be extended relative to inner section 34, which may occur while bin sweep 10 moves in the direction of arrow 40, or while bin sweep 10 is stationary.

Outer section 36 also includes guide sleeve 66, which in the shown embodiment, extends from inner end 56 to proximate outer end 58. As discussed below, extension drive assembly 50 is engaged with guide sleeve 66 to move guide sleeve 66 (and outer section 36) relative to inner section 34, along an axis that is parallel or substantially parallel to the longitudinal length of inner section 34 (referred to as axis 68). As shown in FIG. 2, while outer section 36 is full retracted, extension drive assembly 50 may extend outer section 36 along axis 68 in the direction of arrow 70 to increase the footprint that bin sweep 10 is capable of covering.

As shown in FIG. 3, as extension drive assembly 50 moves outer section 36 along axis 68 in the direction of arrow 70, the movement of guide sleeve 66 relative to inner section 32 exposes track 72. Track 72 is mounted to section frame 46 of inner section 34. As discussed below, track 72 restricts the range of movement of guide sleeve 66, and therefore, of outer section 36, to directions along axis 68. As such, guide sleeve 66 and track 72 define a range of motion for outer section 36 relative to inner section 34 that is parallel or substantially parallel to the longitudinal length of inner section 34.

As shown in FIG. 4, as extension drive assembly 50 continues to move outer section 36 along axis 68, the movement of guide sleeve 66 relative to inner section 32 further exposes track 72 until outer section 36 is fully extended relative to inner section 34, as shown. In this extended state, bin sweep 10 may then cover a greater footprint of bin floor 18 compared to the footprints attainable with bin sweep 10 in the retracted state or in the partially-extended state.

When desired, such as when the bin clean-out is completed, extension drive assembly 50 may then retract outer section 36 along axis 68 in the direction of arrow 73 to reduce the footprint of bin sweep 10. Extension drive assembly 50 may continue to retract outer section 36 until outer section 36 is partially extended (e.g., as shown in FIG. 3) and/or until outer section 36 is fully retracted (as shown in FIG. 2).

Bin sweep 10 may be operated in several alternative manners to drive grain to central sump 26. For instance, bin sweep 10 may pass through the grain in chamber 30 in different extension orientations at different stages, including multiple passes through chamber 30. In one embodiment, bin sweep 10 is rotated approximately 360° about central axis 42 in its retracted configuration (as shown in FIG. 2). Extension drive assembly 50 may then be activated to extend outer section 36 in the direction of arrow 70 (shown in FIGS. 2 and 3) and bin sweep 10 may make a second pass through the grain bin of approximately 360° to pick up additional grain adjacent to bin wall 14. During all passes through chamber 30, augers 44 and 60 may be driven by their respective auger motors 50 and 68, and the alignment system may be operative to maintain bin sweep 10 in a generally radial alignment relative to central axis 42. Operation of the various motors and sensors for bin sweep 10 may be controlled by one or more microprocessors which are desirably programmed to facilitate operation and management of bin sweep 10 in an efficient manner, and as desired by a grain bin clean-out operator.

In one embodiment, the motors on the bin sweep 30 are electrical, and thus may be coupled, adjacent an inner end 38 of the inner section 34 to a source of power and operational control. Because of possible interference caused by the uprights 22 of the support framework 20 with the wiring for the motors and/or sensors, it may be necessary after each rotation of bin sweep 10 around central axis 42 to have an operator enter grain bin 12. That operator can then disconnect the wires or other connections, reroute them to bin sweep 10 to free them from clearance of support framework 20 and reconnect them to allow a second revolution of bin sweep 10 about the central axis 42. This is the only human intervention normally required within grain bin 12 for operation of bin sweep 10.

In some embodiments, the wires and connections may be of a form where human intervention is further minimized (such as wires long enough to allow two rotations or bin sweep passes, or of a form which would allow the transfer of power (and/or operational instructions or sensor readings)

continuously, without disconnection, between bin sweep 10 and guide 28). In addition, the motors on bin sweep 10 may be hydraulic or some other suitable motive means, or a combination of motive means, such as a combination of electric and hydraulic motors.

Figure 5:
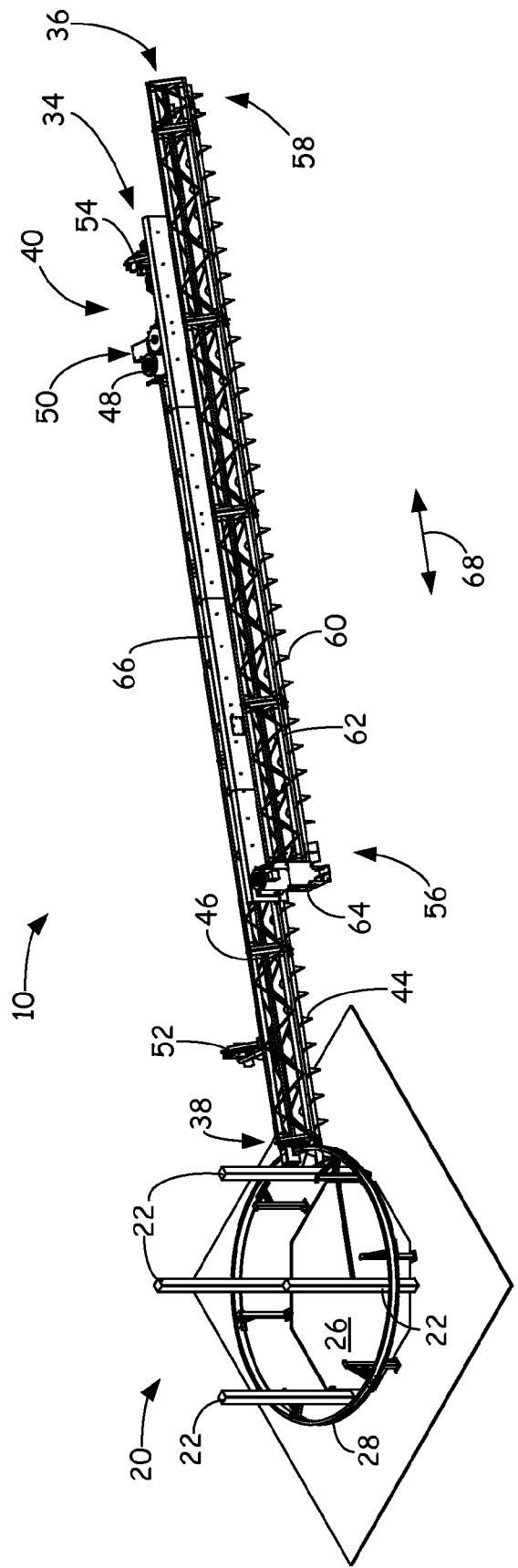
FIG. 5 is an isometric view in use with the central support framework, where the outer section is in the retracted state relative to the inner section.
Figure 6:
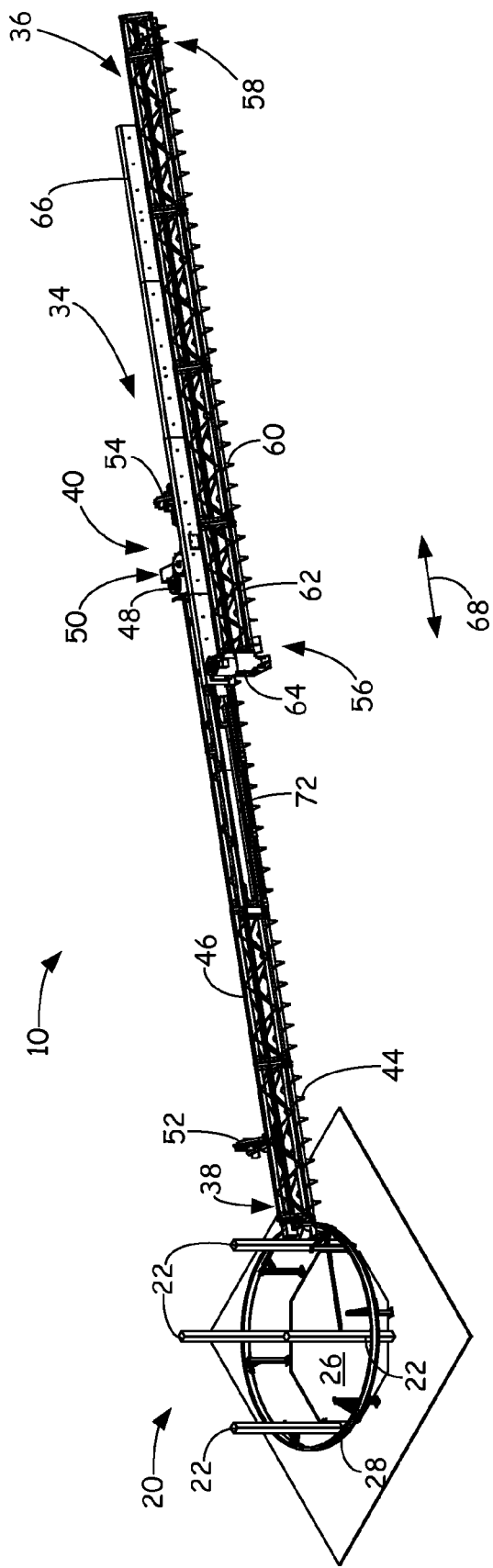
FIG. 6 is an isometric view in use with the central support framework, where the outer section is fully extended relative to the inner section.

FIGS. 5 and 6 further illustrate bin sweep 10 in the retracted and fully-extended states, respectively. Once grain bin 12 has been emptied of grain, bin sweep 10 may be positioned for reuse for that occasion when grain bin 12 will be refilled with grain. To position bin sweep 10 in an empty grain bin 12 for reuse, tractors 52 and 54 of bin sweep 10 may be activated to park bin sweep 10 over inlet 32 (shown in FIG. 1). Grain bin 12 is then ready to receive grain again. Once more grain has been disposed in chamber 30 of grain bin 12, the bin sweep 30 is thus already efficiently positioned for grain removal. In this regard, when grain is to be removed from chamber 30, central sump 26 may be opened, which allows grain to drop by gravity into engagement with the in-floor auger of grain bin 12 at in-floor shaft 28.

Inlet 32 may also be opened to further release grain by gravity into engagement with in-floor shaft 28. Once grain no longer exits the grain bin via natural gravity forces simply by opening these sumps, auger motors 48 and 64 on bin sweep 10 maybe activated to rotate the flighting of the augers 44 and 66 to further drive grain toward central sumps 26 and/or inlet 32. Eventually, the tractors 52 and 54 may be activated on bin sweep 10 to cause bin sweep 10 to move across the bin floor 18 to actively engage and direct grain from chamber 30 toward central sump 26 and/or inlet 32. As discussed above, operation of bin sweep 10 may be performed in one or multiple passes, with the extension of outer section 36 relative to its inner section 34 happening at the discretion of an operator, or via a preprogrammed operational protocol.

Figure 7:
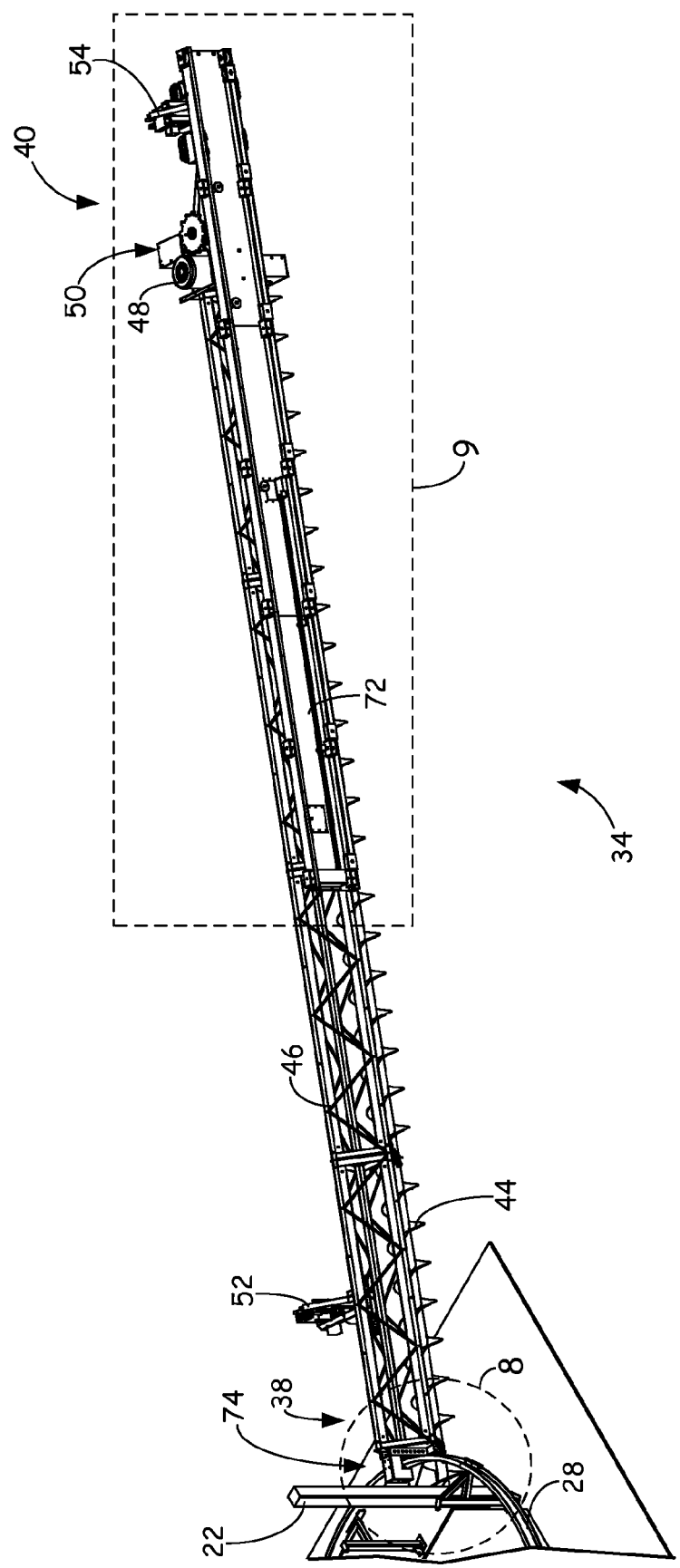
FIG. 7 is an isometric view of the inner section of the extendable bin sweep.
Figure 8:
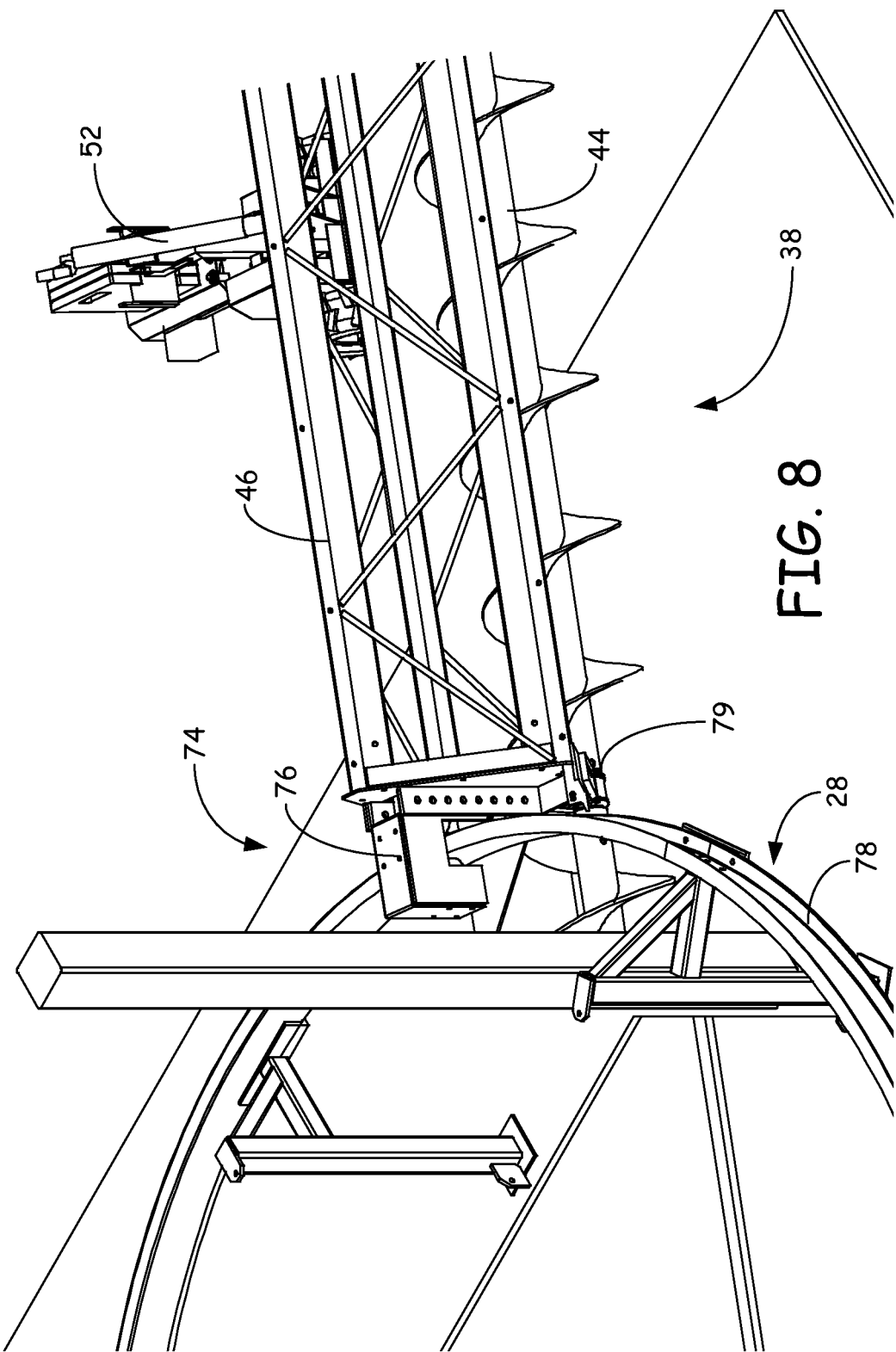
FIG. 8 is an expanded view of section 8 taken in FIG. 7, illustrating an engagement mechanism for movably mounting the inner section to a guide of the central support framework.
Figure 9:
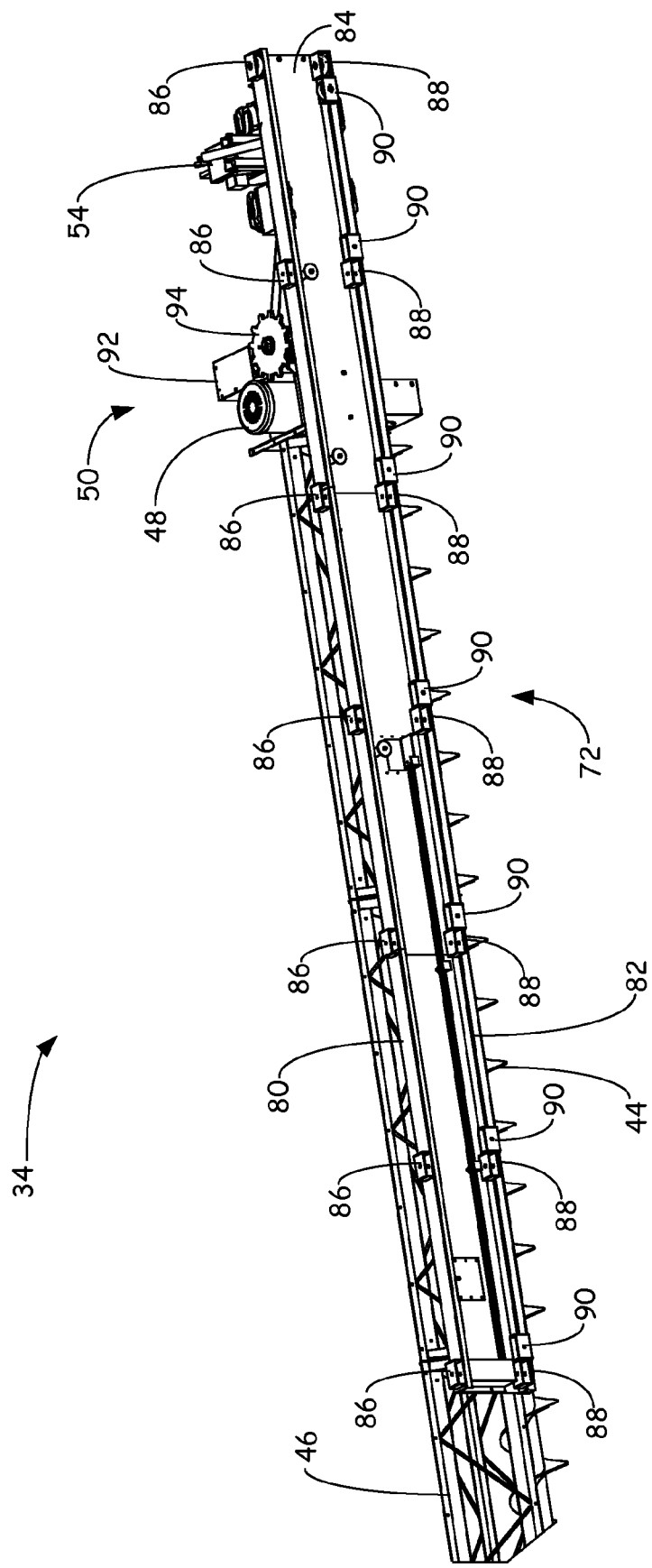
FIG. 9 is an expanded view of section 9 taken in FIG. 7, illustrating a track of the inner section.

FIGS. 7-9 further illustrate inner section 34 of bin sweep 10, where outer section 36 is omitted for ease of discussion. As shown in FIG. 7, inner section 34 also includes engagement mechanism 74 at inner end 38, where engagement mechanism 74 is an example of a suitable mechanism for movably engaging inner section 34 to guide 28.

As shown in FIG. 8, engagement mechanism 74 includes bearing bracket 76 secured to section frame 46 at inner end 38. Bearing bracket 76 extends around guide 28 in an inverted U-shape arrangement and includes a pair of rollers that engage with guide 28. As shown, guide 28 includes channel 78 on its outer face, which the reciprocating roller of bearing bracket 76 engages for restricting the movement of bin sweep 10 to directions in the horizontal plane around guide 28. Engagement mechanism 74 allows bin sweep 10 to move around chamber 30, while also preventing bin sweep 10 from colliding with uprights 22.

In an alternative embodiment, engagement mechanism 74 may engage with guide 28 with a traction-wheel engagement. For example, guide 28 may take the form of a rack, and engagement mechanism 74 may include a traction wheel that functions as a motorized pinion, thereby providing a "rack and pinion" connection with the rack of guide 28. Rotation of pinion would thus cause movement of bin sweep 10 relative to the rack of guide 28. Such an arrangement may take the place of, or be in addition to the use of tractors 52 and 54.

As further shown in FIG. 8, inner section 34 also includes support brace 79, which, in the shown embodiment, is mounted to section frame 46 at inner end 38 and extends around auger 44 with a bearing assembly. This allows the inner end of auger 44 to be rotatably supported by section frame 46.

As shown in FIG. 9, track 72 is fixedly secured to section frame 46 and extends inward along section frame 46 from outer end 38. Track 72 includes top rail 80 and bottom rail 82 offset by back plate 84, where top rail 74 includes roller assemblies 86, and bottom rail 82 includes roller assemblies 88 and 90. As discussed below, roller assemblies 86 and 88 are bearing roller assemblies configured to restrict the horizontal range of motion of guide sleeve 66 (shown in FIGS. 2-6), while also allowing guide sleeve 66 to move along axis 68. Additionally, roller assemblies 90 are bearing roller assemblies configured to restrict the vertical range of motion of guide sleeve 66, while also allowing guide sleeve 66 to move along axis 68.

As further shown in FIG. 9, extension drive assembly 50 includes drive motor 92 and gear 94, where gear 94 is operably connected to drive motor 92 for rotating gear 94. As discussed below, gear 94 is configured to engage a reciprocating gear track (not shown) that extends along guide sleeve 66. This arrangement allows gear 66 to move guide sleeve 66 under the rotational power of drive motor 92 to extend and retract outer section 36 along axis 68.

Figure 10:
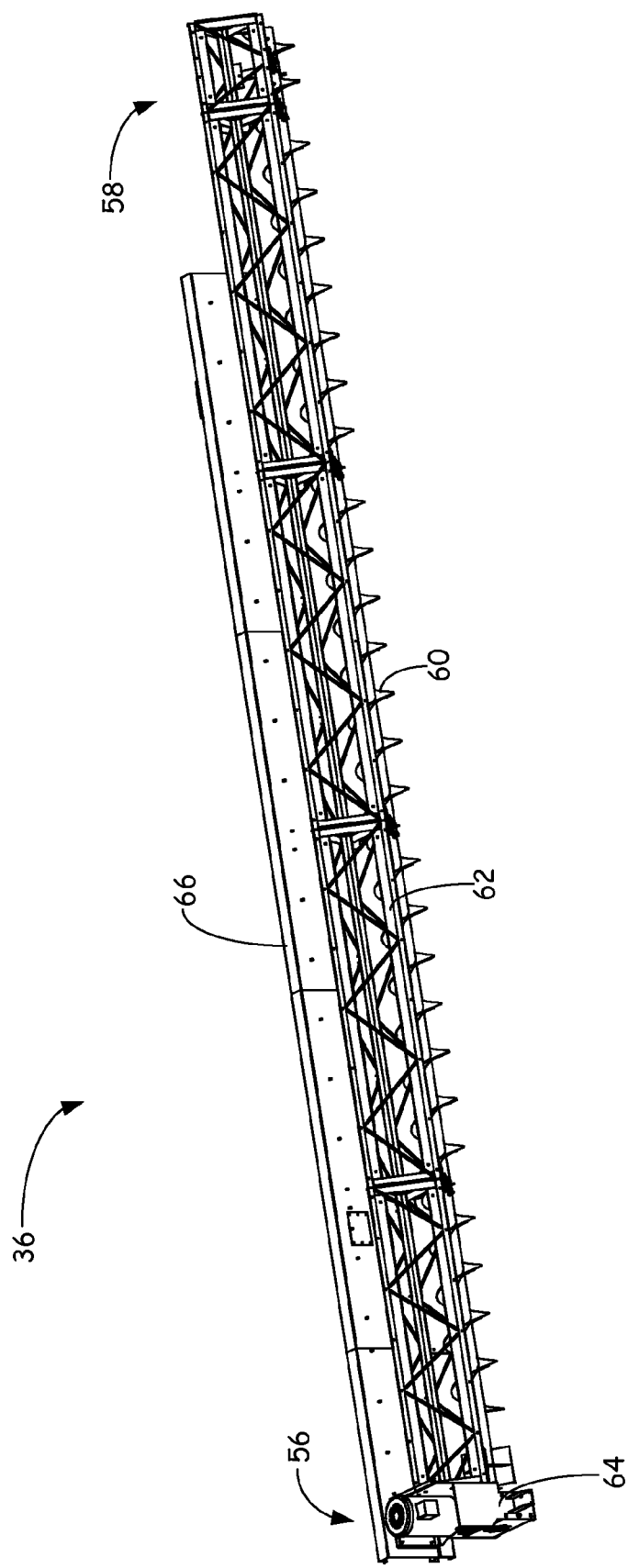
FIG. 10 is an isometric view of the outer section of the extendable sweep.

FIG. 10 illustrates outer section 36. As shown, guide sleeve 66 is fixedly secured to a back side of section frame 62 of outer section 36 in a manner that allows guide sleeve 66 to engage with roller assemblies 86, 88, and 90 of track 72 (shown in FIG. 9). Outer section 36 also includes support braces (not shown) mounted to section frame 62 at outer end 58 and extends around auger 60 with a bearing assembly. This allows the outer end of auger 60 to be rotatably supported by section frame 62.

Figure 11:
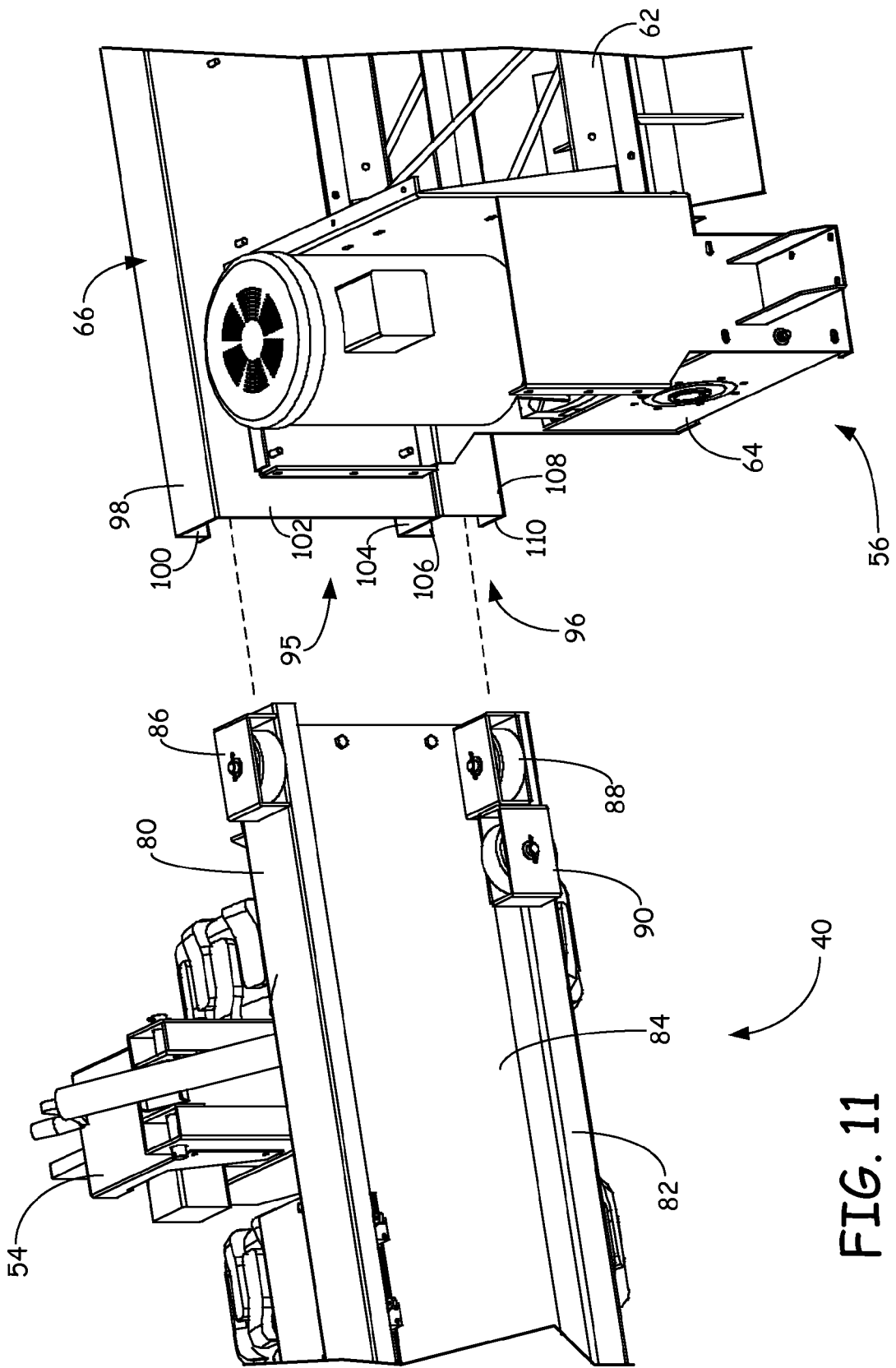
FIG. 11 is an exploded view of the engagement between a guide sleeve of the outer section and the track of the inner section.
Figure 12:
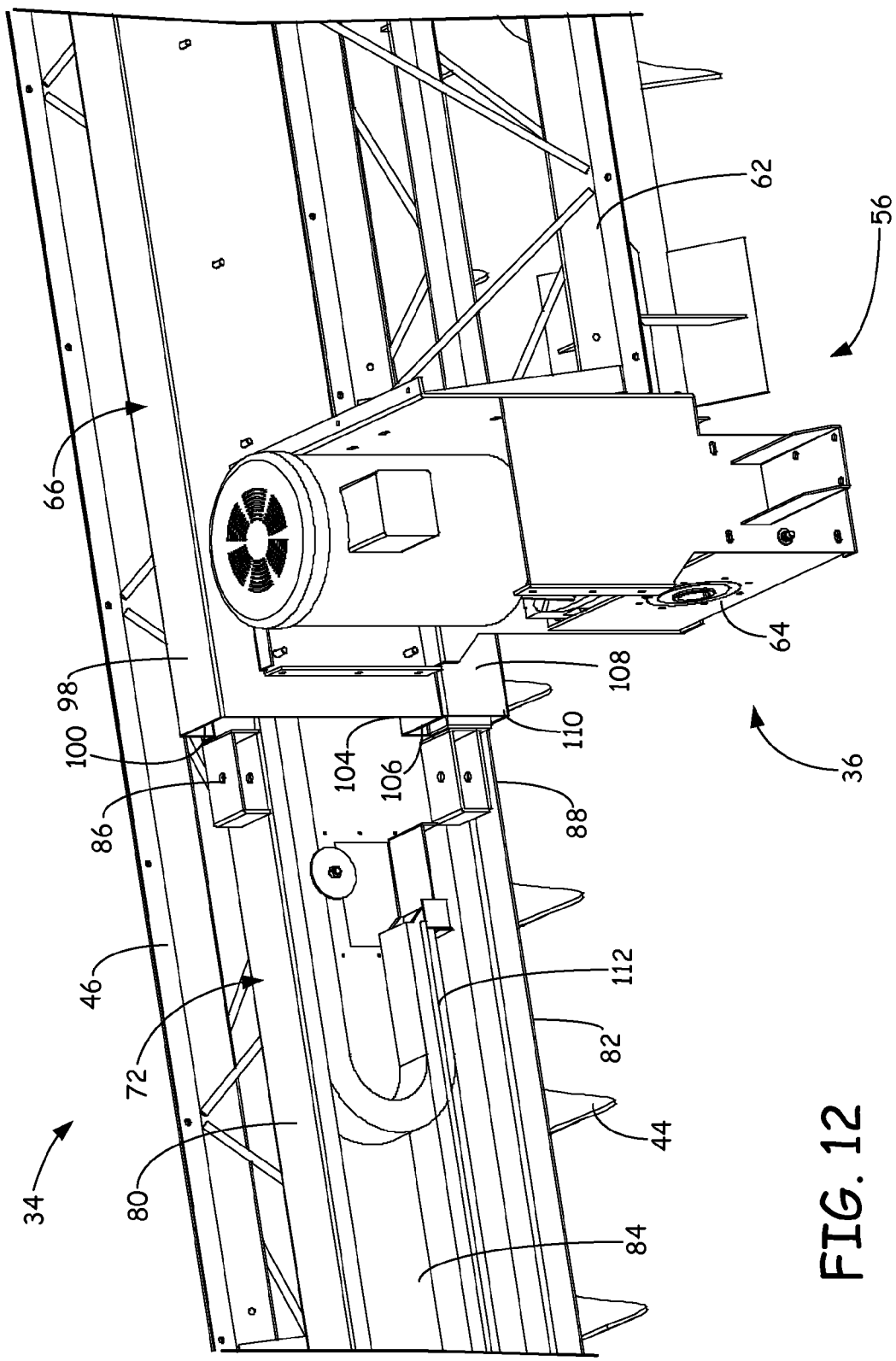
FIG. 12 is an expanded view of the engagement between the guide sleeve of the outer section and the track of the inner section, where the outer section is fully extended relative to an inner section, as shown in FIG. 6.

FIGS. 11 and 12 illustrate the engagement between guide sleeve 66 and track 72. As shown in FIG. 11, guide sleeve 66 has dimensions that define upper sleeve 95 and lower sleeve 96. In particular, upper sleeve 95 is defined by top rim 98, rear tab 100, front wall 102, and intermediate rim 104. Similarly, lower sleeve 96 is defined by intermediate rim 104, rear tab 106, front wall 108, and bottom rim 110. Lower sleeve 96 is configured to slide around roller assemblies 88 and 90 of bottom rail 82, where roller assemblies 88 restrict movement of guide sleeve 66 in the horizontal direction, and roller assemblies 90 restrict movement of guide sleeve 66 in the vertical direction. Additionally, upper sleeve 95 is configured to slide around roller assemblies 86 of top rail 80, thereby further restricting movement of guide sleeve 66 in the horizontal direction. The combination of roller assemblies 86 and 88 with upper sleeve 95 and lower sleeve 96 also prevent guide sleeve 66 (and outer section 36) from rotating axially, thereby maintaining the axial orientation of outer section 36 substantially fixed relative to inner section 34.

As shown in FIG. 12, and as discussed above, when outer section 36 is fully extended, track 72 is exposed. In the shown embodiment, inner section 34 also includes umbilical 112 retained by track 72 adjacent to back plate 84, where umbilical 112 is a flexible conduit configured to contain electrical lines for powering auger motor 64. Umbilical 112 is configured to flex to follow the movement of outer section 36 along axis 68, and is suitable for protecting the electrical lines from the grains and other contaminants that reside in chamber 30.

Figure 13:
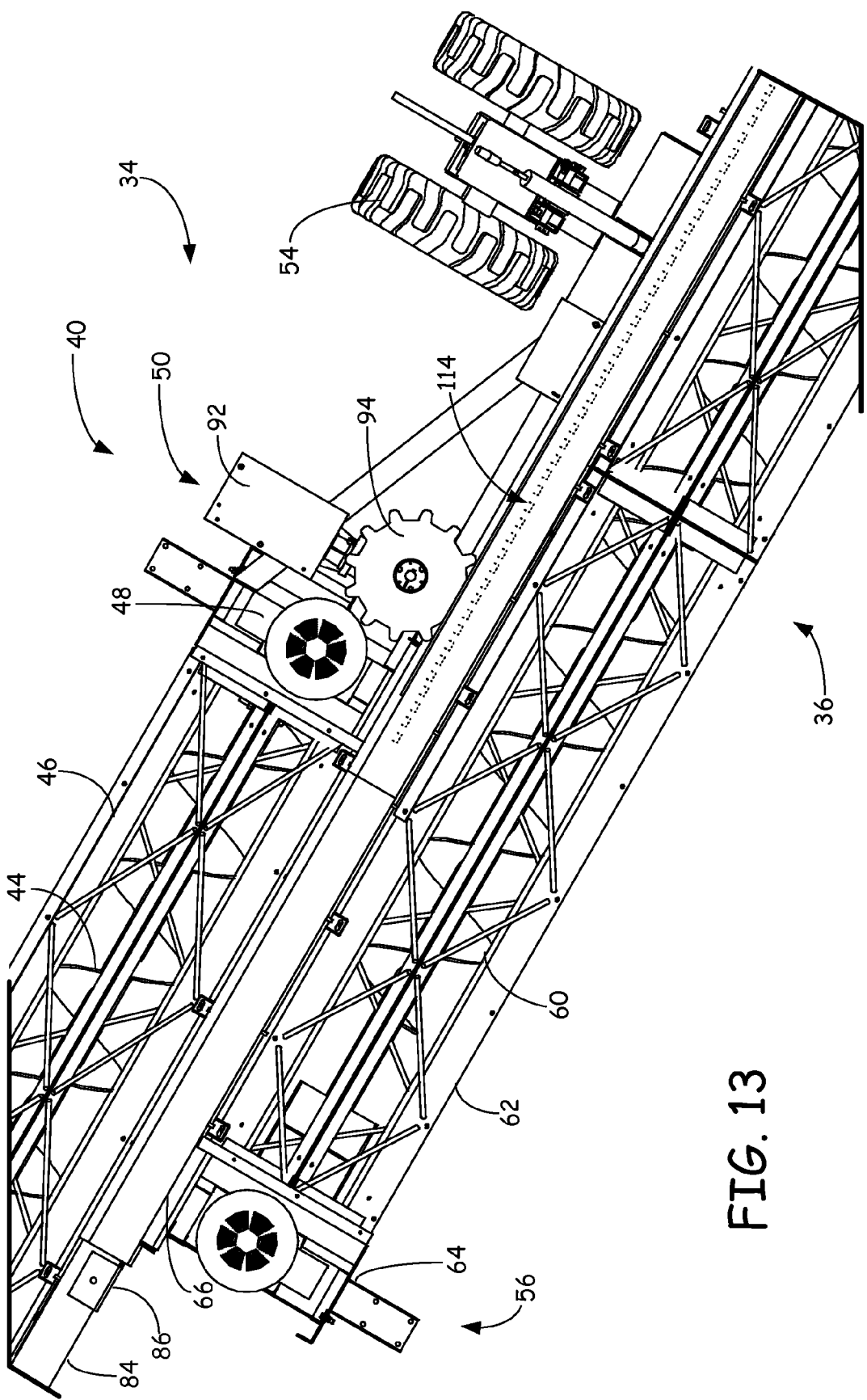
FIG. 13 is an expanded top elevational view of the engagement between the guide sleeve of the outer section and the track of the inner section, where the outer section is fully extended relative to an inner section, as shown in FIG. 4.

FIG. 13 illustrates the engagement between extension drive assembly 50 and guide sleeve 66. As shown, guide sleeve 66 includes gear track 114 (shown with hidden lines) that are engaged with gear 94 of extension drive assembly 50. Accordingly, when drive motor 92 directs gear 94 to rotate in a counter-clockwise direction as taken from the top elevational view shown in FIG. 13, the engagement between gear 94 and gear track 114 drives guide sleeve 66 via roller assemblies 86, 88, and 90 along axis 68 in the direction of arrow 70 (shown in FIGS. 2 and 3) to extend outer section 36 relative to inner section 34. Alternatively, when drive motor 92 directs gear 94 to rotate in a clockwise direction as taken from the top elevational view shown in FIG. 13, the engagement between gear 94 and gear track 114 drives guide sleeve 66 along roller assemblies 86, 88, and 90 along axis 68 in the direction of arrow 73 (shown in FIG. 4) to retract outer section 36 relative to inner section 34.

The range of motion of outer section 36 relative to inner section 34 may therefore be controlled by the rotation of gear 94. Furthermore, when outer section 36 reaches a desired position (e.g., a retracted or fully extended position), gear 94 may stopped, thereby locking outer section 36 at the desired position. In some embodiments, inner section 34 and/or outer section 36 may also include one or more locking mechanisms to further assist in locking the position of outer section 36 relative to inner section 34. Additionally, in some embodiments, inner section 34 and/or outer section 36 may include one or more hard stops to restrict the range of motion of outer section 34 along axis 68.

Figure 14A:
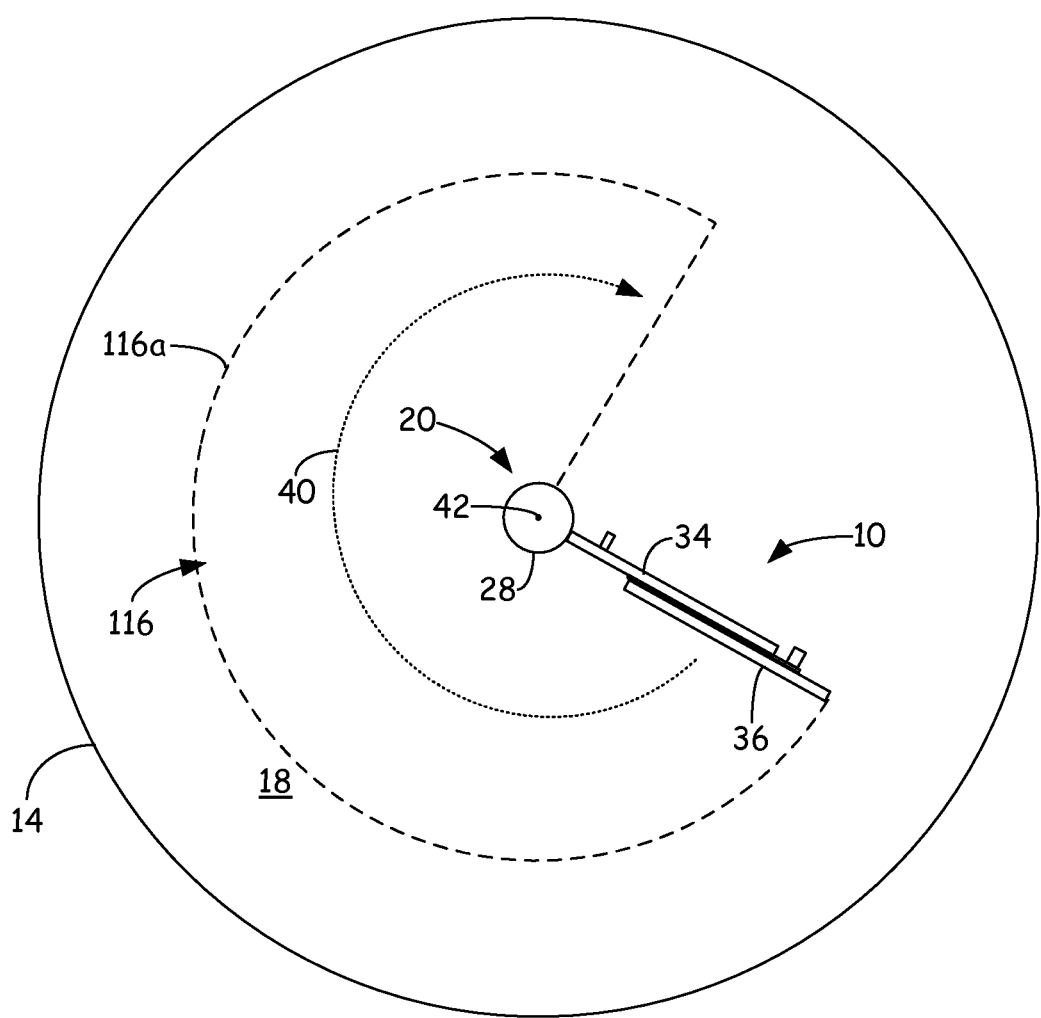
FIG. 14A is a schematic plan view of a first stage of a three-stage bin cleaning protocol using the extendable bin sweep of the present disclosure, where the first stage covers about 270 degrees of rotation about a bin floor of the grain bin.
Figure 14B:
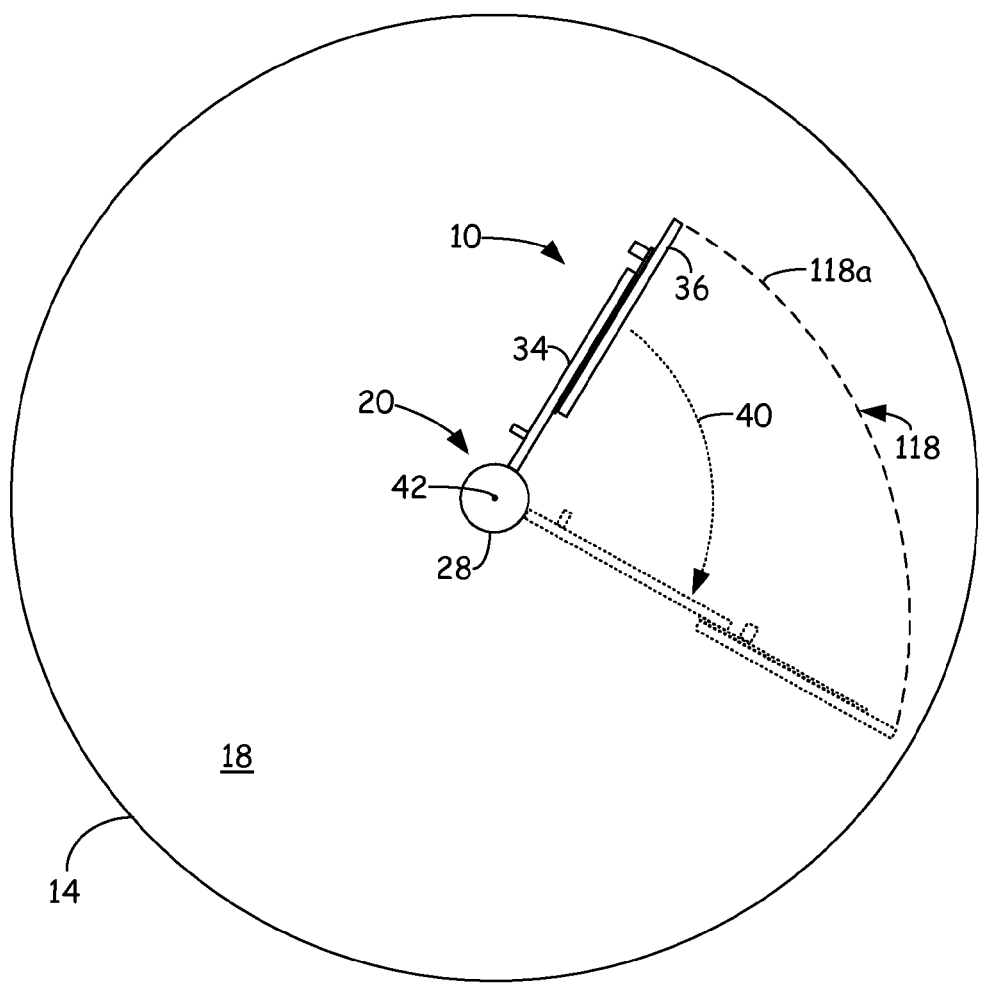
FIG. 14B is a schematic plan view of a second stage of the three-stage bin cleaning protocol using the extendable bin sweep of the present disclosure, where the second stage covers about 90 degrees of rotation about the bin floor.
Figure 14C:
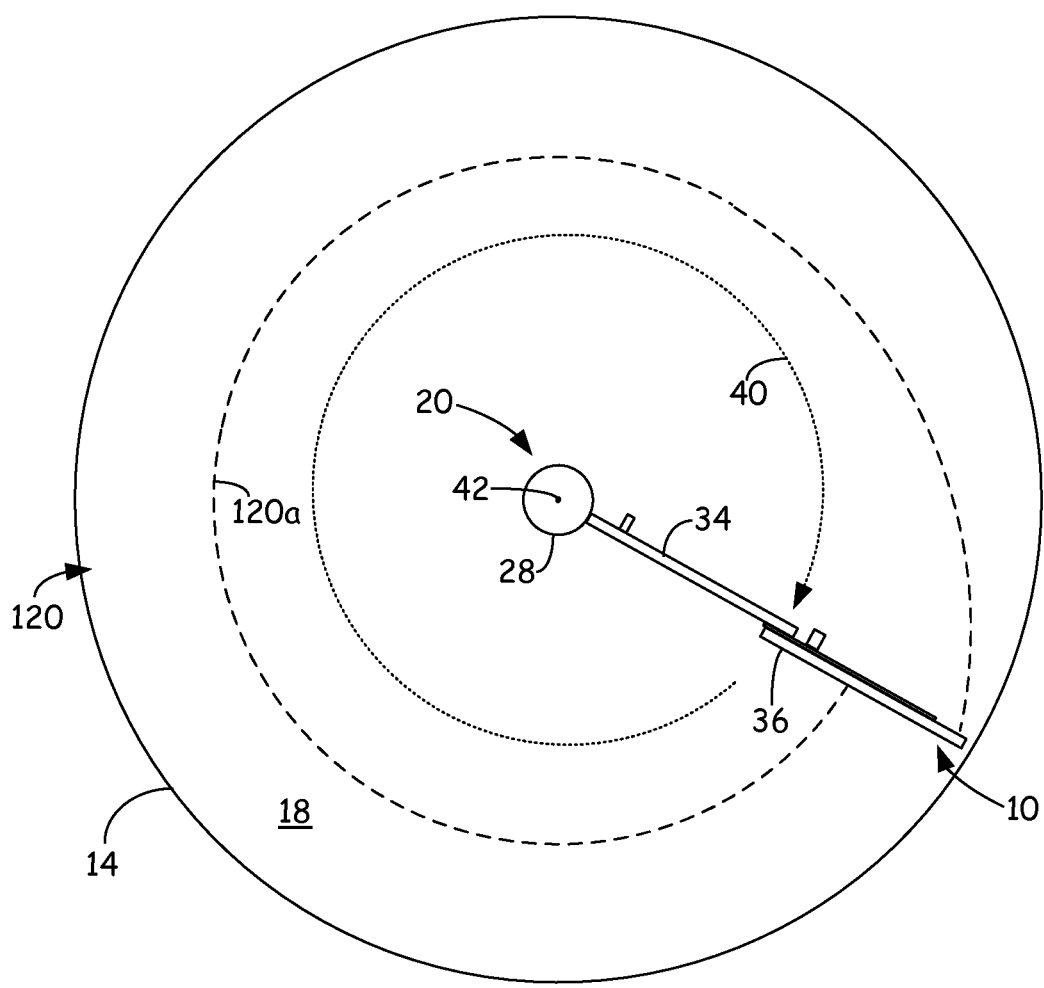
FIG. 14C is a schematic plan view of a third stage of the three-stage bin cleaning protocol using the extendable bin sweep of the present disclosure, where the third stage covers a second revolution about the bin floor.

FIGS. 14A-14C illustrate a three-stage bin cleaning protocol using bin sweep 10 in bin grain 12. As shown in FIG. 14A, bin sweep 10 may pass across the bin floor 18 to cover approximately an arc of 270 degrees as it moves in direction of arrow 40. At this first stage, outer section 36 may be retracted, as illustrated in FIGS. 2 and 5, so that the grain engaged and collected during this first stage is illustrated schematically by area 116, which is the area between guide 28 and broken line 116a.

As shown in FIG. 14B, while bin sweep 10 continues moving along bin floor 18 in direction arrow 40, outer section 36 may be extended relative to inner section 34. The extension of outer section 36 may takes place while bin sweep 10 is moving, and thus the arc swept by bin sweep 10 becomes larger in radius over time. This second stage generally extends for about 90 degrees, as illustrated in FIG. 14B. By the end of the second stage, bin sweep 10 has completed approximately one complete revolution of bin floor 18. The grain that has been engaged by bin sweep 10 during the second stage is illustrated by area 118, which is the area between guide 28 and broken line 118a.

As shown in FIG. 14C, when outer section 36 is fully extended, as illustrated in FIGS. 4 and 6, bin sweep 10 may remain in its fully-extended state for approximately one additional revolution about central axis 42. Area 120, shown in FIG. 14C between broken line 120a and bin wall 14, illustrates the area of grain which generally had not previously been engaged by bin sweep 10, but are now engaged during its third stage of movement across bin floor 18. Of course, as desired or necessary, additional partial or complete revolutions of bin sweep 10 through chamber 30 may be necessary for complete removal of the grain.

In one embodiment, bin sweep 10 may also be used with a "bin wall following" system. In this embodiment, after the second stage is initiated, sensors mounted on outer end 58 of outer section 36 may control the extension and retraction of outer section 36 to maintain a specific distance between outer section 36 and bin wall 14. This embodiment is suitable for increasing the grain removal from a grain bin that is not truly circular, or that has a bin wall center offset from the central support framework.

The multi-stage deployment of the bin sweep illustrated in FIGS. 14A-14C is just one example of how bin sweep 10 may be extend over time. Numerous other deployment arrangements may also be used. The arcs traversed during the three stages may be different from the 270-degree/90-degree/360-degree arc arrangement. For instance, a 360-degree/0-degree/360-arc arrangement may be used. In addition, bin sweep 10 may be extended incrementally, thus adding additional stages to the process. Also, in some instances more than two passes through chamber 30 may be necessary to achieve the desired level of grain removal.

The above discussion of bin sweep 10 is made in reference to grain bin 12 having support framework 20. In alternative embodiments, bin sweep 10 may be movably mounted to a central pivot, such as in a grain bin that has no central support framework 20. In these embodiments, while bin sweep 10 is still extendable and retractable, inner end 38 of inner section 34 may be mounted to pivot about central axis 42, and no guide 28 in the form of a rail, tube, or the like is necessarily provided.

Furthermore, while bin 10 is illustrated for use in connection with a cylindrical grain bin having a circular floor (i.e., grain bin 12), other storage bin configurations can also be swept using an extendable bin sweep of the present disclosure. For example, a storage bin having an elongated shape such as a rectangle or oval may also be at least partially cleared of grain using bin sweep 10. In this situation, the area traversed by bin sweep 10 may be dependent in some regard upon the shape of guide 28. For example, guide 28 may be formed as a half circle, or in a U-shape, or in an oval shape (or other suitable shapes) to permit controlled travel of bin sweep 10 across the floor of the storage bin.

When guide 28 is circular in form, as discussed above, sensors may be employed as one means for detecting whether bin sweep 10 is skewed from a radial line relative to central axis 42, and an alignment control system may then be used to realign bin sweep 10. In other words, bin sweep 10 may be maintained perpendicular to a tangent of circular guide 28 at the point where bin sweep 10 connects to guide 28. When the guide is non-circular, the alignment of the bin sweep relative to the guide may be similarly regulated, via sensors that detect possible skew (i.e., when the bin sweep is not perpendicular to a tangent of the guide at the point where the bin sweep connects to the guide) and a suitable alignment control system. In this regard, such skew sensing and alignment control is independent of whether bin sweep 10 is extendable.

Outer section 36 of bin sweep 10 may be extended or retracted as necessary, such as to engage that grain which is disposed in the corner of a rectangular or otherwise non-circular building. In this regard, the above-discussed "bin wall following" system may be provided to control extension and retraction of outer section 36, as a function of the shape of the bin wall, as detected by a wall sensor disposed on outer end 58 of outer section 36. In addition, if guide 28 alternatively includes straight segments, tractors 52 and 54 may run at the same rate while bin sweep 10 traverses those straight segments, but at different rates when guide 28 is curved.

Although the present disclosure has been described with respect to several embodiments, workers skilled in the art will recognize that changes may be made in form and detail without departing from the spirit and scope of the disclosure.

The invention claimed is:

1. A bin sweep comprising:
   a first auger section configured to be movably mounted to a central support framework of a storage bin;
   a second auger section operably engaged with the first auger section such that the second auger section is moveable relative to the first auger section substantially along an axis, wherein the first auger section and the second auger section are not co-axial;
   a track secured to the first auger section and configured to direct the movement of the second auger section relative to the first auger section; and
   a roller and guide sleeve assembly configured to restrict the movement of the second auger section relative to the first auger section along a second axis that is perpendicular to the axis of movement of the second auger section.

2. The bin sweep of claim 1 wherein the guide sleeve is mounted to the second auger section and engaged with the track in a manner that restricts movement of the second auger section relative to the first auger section to directions substantially along the axis of movement of the second auger section.

3. The bin sweep of claim 2, and further comprising an extension drive assembly operably mounted to the first auger section and configured to engage with the guide sleeve.

4. The bin sweep of claim 3, wherein the extension drive assembly comprises:
a drive motor operably mounted to the first auger section; and a gear operably connected to the drive motor, wherein the gear is configured to engage with the guide sleeve.

5. The bin sweep of claim 1, wherein the first auger section comprises:
a section frame having a first end and a second end offset along a longitudinal length;
an auger rotatably mounted to the section frame and extending substantially along the longitudinal length of the section frame; and
an auger motor operably mounted to the section frame and operably connected to the auger.

6. The bin sweep of claim 1, wherein the first auger section comprises an engagement mechanism configured to engage with a guide of a central support framework of the storage bin.

7. A bin sweep comprising:
a first auger section configured to be movably mounted to a central support framework of a storage bin;
a second auger section operably engaged with the first auger section such that the second auger section is moveable relative to the first auger section substantially along an axis;
a track secured to the first auger section and configured to direct the movement of the second auger section relative to the first auger section;
a plurality of first roller assemblies configured to restrict the movement of the second auger section relative to the first auger section along a second axis that is perpendicular to the axis of movement of the second auger section; and
a plurality of second roller assemblies configured to restrict the movement of the second auger section relative to the first auger section along a third axis that is perpendicular to the axis of movement of the second auger section and that is perpendicular to the second axis.

8. A bin sweep comprising:
a first section frame having a first end and a second end, the first end of the first section frame being configured to be movably mounted to a central support framework of a storage bin;
a first auger rotatably supported by the first section frame;
a track operably secured to the first section frame;
a second section frame having a first end and a second end;
a second auger rotatably supported by the second section frame, wherein the first auger and the second auger are not co-axial;
a guide sleeve operably secured to the second section frame and engaged with the track to restrict movement of the second section frame relative to the first section frame to directions that are substantially along an axis; and
a drive motor operably mounted to at least one of the first section frame and the second section frame, the drive motor being configured to direct the movement of the second section frame relative to the first section frame.

9. The bin sweep of claim 8, and further comprising at least one tractor operably mounted to the first section frame.

10. The bin sweep of claim 8, wherein the track comprises a plurality of first roller assemblies configured to restrict the movement of the second section frame relative to the first section frame along a second axis that is perpendicular to the axis of movement of the second section frame.

11. A bin sweep comprising:
a first section frame having a first end and a second end, the first end of the first section frame being configured to be movably mounted to a central support framework of a storage bin;
a first auger rotatably supported by the first section frame;
a track operably secured to the first section frame;
a second section frame having a first end and a second end;
a second auger rotatably supported by the second section frame
a guide sleeve operably secured to the second section frame and engaged with the track to restrict movement of the second section frame relative to the first section frame to directions that are substantially along an axis; and
a drive motor operably mounted to at least one of the first section frame and the second section frame, the drive motor being configured to direct the movement of the second section frame relative to the first section frame, wherein the guide sleeve comprises a gear track, and wherein the bin sweep further comprises a gear operably connected to the drive motor and engaged with the gear track of the guide sleeve.

12. A bin sweep comprising:
a first section frame having a first end and a second end, the first end of the first section frame being configured to be movably mounted to a central support framework of a storage bin;
a first auger rotatably supported by the first section frame;
a track operably secured to the first section frame;
a second section frame having a first end and a second end;
a second auger rotatably supported by the second section frame;
a guide sleeve operably secured to the second section frame and engaged with the track to restrict movement of the second section frame relative to the first section frame to directions that are substantially along an axis; and
a drive motor operably mounted to at least one of the first section frame and the second section frame, the drive motor being configured to direct the movement of the second section frame relative to the first section frame;
wherein the track comprises:
a plurality of first roller assemblies configured to restrict the movement of the second section frame relative to the first section frame along a second axis that is perpendicular to the axis of movement of the second section frame; and
a plurality of second roller assemblies configured to restrict the movement of the second section frame relative to the first section frame along a third axis that is perpendicular to the axis of movement of the second section frame and that is perpendicular to the second axis.

13. The bin sweep of claim 12, wherein the guide sleeve comprises:
a first sleeve configured to engage with at least a portion of the plurality of first roller assemblies; and
a second sleeve configured to engage with at least a portion of the plurality of first roller assemblies and with at least a portion of the plurality of second roller assemblies.

14. The bin sweep of claim 13, wherein the engagements between first sleeve and the second sleeve with the portions of the plurality of first roller assemblies restricts an axial rotation of the second section frame relative to the first section frame.

15. A bin sweep comprising:
- a first section frame having a first end and a second end, the first end of the first section frame being configured to be movably mounted to a central support framework of a storage bin;
- a first auger rotatably supported by the first section frame;
- a track operably secured to the first section frame;
- a second section frame having a first end and a second end;
- a second auger rotatably supported by the second section frame;
- guide sleeve operably secured to the second section frame and engaged with the track to restrict movement of the second section frame relative to the first section frame to directions that are substantially along an axis,
- a drive motor operably mounted to at least one of the first section frame and the second section frame, the drive motor being configured to direct the movement of the second section frame relative to the first section frame;
- a first auger motor operably mounted to the first section frame and operably connected to the first auger; and
- a second auger motor operably mounted to the second section frame and operably connected to the second auger.

* * * * *